US008185701B2

(12) United States Patent
Berger et al.

(10) Patent No.: US 8,185,701 B2
(45) Date of Patent: May 22, 2012

(54) SYSTEM AND METHOD FOR AN ADAPTIVE LIST PREFETCH

(75) Inventors: Jeffrey A. Berger, San Jose, CA (US);
You-Chin Fuh, San Jose, CA (US); Yue Huang, San Jose, CA (US); Hong Min, Poughkeepsie, NY (US); Terence P. Purcell, Springfield, IL (US);
Kou-Horng A. Yang, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 835 days.

(21) Appl. No.: 12/025,801

(22) Filed: Feb. 5, 2008

(65) Prior Publication Data
US 2009/0198738 A1    Aug. 6, 2009

(51) Int. Cl.
*G06F 13/00* (2006.01)
*G06F 13/28* (2006.01)

(52) U.S. Cl. ............... 711/147; 710/36; 707/705
(58) Field of Classification Search .......... 707/705, 707/708; 710/36; 711/147
See application file for complete search history.

(56) References Cited

U.S. PATENT DOCUMENTS

| | | | | |
|---|---|---|---|---|
| 4,511,964 A * | 4/1985 | Georg et al. | ........... | 711/202 |
| 5,761,706 A | 6/1998 | Kessler et al. | | |
| 6,064,625 A | 5/2000 | Tomita | | |
| 6,438,646 B1 * | 8/2002 | Kitamura et al. | ......... | 711/112 |
| 6,606,617 B1 | 8/2003 | Bonner et al. | | |
| 6,633,968 B2 | 10/2003 | Zwiegincew et al. | | |
| 6,915,404 B1 * | 7/2005 | Desai et al. | ............ | 711/204 |
| 6,993,629 B2 * | 1/2006 | Beardsley et al. | ......... | 711/137 |
| 7,039,766 B1 | 5/2006 | Smith | | |
| 7,058,636 B2 | 6/2006 | Coldewey | | |
| 7,120,759 B2 | 10/2006 | Chiu et al. | | |
| 7,206,795 B2 | 4/2007 | Bono | | |
| 7,472,256 B1 | 12/2008 | Nair et al. | | |
| 2004/0064577 A1 | 4/2004 | Dahlin et al. | | |
| 2005/0050264 A1 * | 3/2005 | Dahman et al. | ............ | 711/111 |
| 2006/0074872 A1 | 4/2006 | Gordon | | |
| 2006/0080270 A1 | 4/2006 | Mori | | |
| 2006/0212658 A1 * | 9/2006 | Hrle et al. | ............... | 711/137 |
| 2007/0198780 A1 | 8/2007 | Boyd et al. | | |
| 2008/0082489 A1 | 4/2008 | Chen et al. | | |
| 2008/0155226 A1 | 6/2008 | Davis et al. | | |

(Continued)

OTHER PUBLICATIONS

"Filtering Superfluous Prefetches using Density Vectors", Wei-Fen Lin, Steven K. Reinhardt, 2001 International Conference on Computer Design.*

(Continued)

*Primary Examiner* — Apu Mofiz
*Assistant Examiner* — Mohammad Rahman
(74) *Attorney, Agent, or Firm* — Patterson & Sheridan, LLP (57) ABSTRACT

A method, system, and computer program product are provided for retrieving records into a main memory. A first number of gaps and a first total gap size are received for a list of records from a database subsystem. A determination is made of a first average gap size using the first number of gaps and the first total gap size. A determination is made as to whether the first average gap size is greater than a prestaging threshold value. Responsive to the first average gap size being equal to or less than the prestaging threshold value, a prestaging flag is set for the list of records. Then, the list of records is retrieved into the main memory using prestaging.

20 Claims, 7 Drawing Sheets

U.S. PATENT DOCUMENTS

2009/0198738 A1 8/2009 Berger et al.
2009/0198909 A1 8/2009 Speight et al.

OTHER PUBLICATIONS

"Index Usage for Performance", http://www.GabrielleDB2.com, Copyright 2002, pp. 1-29.

"Sorts and List Prefetch", httpL//www.GabrielleDB2.com, Copyright 1984, 2004, pp. 1-50.

Lee et al.,"Adaptive Prefetching Scheme using Web Log Mining in Cluster-Based Web Systems," 2009 IEEE International Conference on Web Services, Jul. 2009, pp. 903-910.

Jiang et al., "An Adaptive Network Prefetch Scheme," IEEE Journal on Selected Areas in Communications, Apr. 1998, vol. 16(3), pp. 358-368.

Ossa et al., "Improving Web Prefetching by Making Predictions at Prefetch," IEEE 3rd EuroNGI Conference on Next Generation Internet Networks, May 2007, pp. 21-27.

Gu et al., "A Novel Weighted-Graph-Based Grouping Algorithm for Metadata Prefetching," IEEE Transactions on Computers, Jan. 2010, vol. 59(1), pp. 1-15.

Berger et al., "Piecemeal List Prefetch," U.S. Appl. No. 12/821,801, filed Jun. 23, 2010.

* cited by examiner

SYSTEM AND METHOD FOR AN ADAPTIVE LIST PREFETCH

BACKGROUND

1. Technical Field

The present application relates generally to an improved data processing system and method. More specifically, the present application is directed to using an Adaptive List Prefetch in order to improve the performance of skip-sequential processing of data.

2. Description of Related Art

A host processor is connected or attached to a storage controller which manages a set of non-volatile storage devices. The non-volatile storage devices are generally spinning disks such as hard disk drives. The storage controller also contains a high-speed cache. Data is read from the cache into the host via a high-speed fiber channel. Disks are generally much slower than the channels, largely because of the time to reposition the disk each time that a new set of data needs to be read. The time to reposition the device is usually called "seek and latency". "Latency time" is a function of the disk rotation speed, and "seek time" involves the mechanical motion of an arm along the radius of the disk.

When an application or database system needs to read data sequentially, a technique known as prestaging (also known sometimes as prefetching) is used to minimize the effects of disk repositioning. Prestaging brings a large chunk of data in the cache, so that less time is spent waiting for seek and latency time; that is, the disk needs to be repositioned less frequently. Furthermore, in cases where the data is striped across multiple disks, such as in a Redundant Array of Independent Drives (or Disks) (RAID) array, prestaging also makes it possible to sequentially read each disk in the array at the same time, transparent to the application. In other words, although the application may serially be read data from the cache, large chunks of data can be simultaneously read from multiple disks into the cache.

Prestaging may be initiated in a number of ways. In some systems, the host processor may request prestaging. Alternatively the storage controller may employ a sequential detection algorithm and choose on its own to employ prestaging. The host processor generally makes its decision based on foresight about what the application is going to do. In the latter case, the storage controller makes its decision based on hindsight about what the application has been doing.

However, there are applications whose data reference patterns are known as "skip-sequential" where prestaging is not done, but where prestaging might be beneficial. Skip-sequential indicates that the records are not-contiguous within the storage device but are relatively close together based on the addresses associated with the records. Whether or not prestaging is beneficial for skip-sequential patterns depends on the clustering of the records. For example, if the application needs to read every other record, it is faster to read every record than it is to try to "skip" every other record.

One known solution for skipping records is a count-key-data (CKD) solution that requires help from the host but is not supported by SCSI architecture. The CKD channel command word (CCW) architecture supports a SKIP flag. On modern storage controllers that emulate CKD architecture, the SKIP flag has to be emulated. Such controllers will read a "skipped" record from the disk into cache, but will not send the record across the channel. Nevertheless, the SKIP flag is not supported by the other systems, such as z/OS Media Manager. In any case, to use the SKIP flag requires a CCW for every skipped record, and on today's fast Fiber Connectivity (FI-CON) channels, every CCW constitutes significant overhead. So, the old SKIP flag architecture is not very efficient.

Another CKD method of skipping records is to generate one Locate Record CCW each time that some records need to be skipped. From the storage controller viewpoint, each Locate Record CCW is treated as if it were a distinct I/O from the previous Locate Record CCW. For example, suppose that a channel program consists of two Locate Record CCWs, and each Locate Record CCW is followed by a Read Data CCW. Further assume that none of the data is in cache. The first Locate Record CCW tells the storage controller which address is going to be read and the following Read Data CCW causes the storage controller to make a request to the physical disk in order to seek to the appropriate track, wait for the disk to position itself to the appropriate record, and then read the record into the controller's cache. As the data is being read into cache, the record may also be sent back to the host. When the host has received the data, the next Locate Record CCW will be sent by the host channel to the storage controller. Performing such operations takes time. During this time, a fast disk may skip past the address specified in the second Locate Record. If that happens, the application must wait for another rotation of the disk. This extra rotation of the device adds to the elapsed time of a skip-sequential application. If the application reads every other record, or every third record, it would have been faster to read every record in order to avoid these lost rotations.

Parallelism gives rise to another reason why it may be faster to read every record than to skip some records. Many RAID device implementations stripe CKD volumes across many disks. Striping a volume is similar to a table in a document, where a disk is a column and a stripe is one of the entries in the table. A stripe includes all of the entries in one row. Often eight disks make up the disk array. When reading sequentially, it is optimal to employ all eight disks at the same time. Theoretically a skip-sequential application could break up Locate Record "domains" into separate reads and writes or input/output operations (I/Os) and execute them in parallel. This would potentially employ every disk in the RAID array, but at the same time increasing the number of I/Os adds overhead to the host system.

SUMMARY

The illustrative embodiments provide mechanisms for improving the performance of skip-sequential processing of records. The illustrative embodiments use the term records, which may also be referred to as pages or blocks. The illustrative embodiments solve the issues with known systems, such as: the issue of sequential performance beginning to degrade when some of the records are buffer hits; poor sequential performance causing the channel utilization to increase and, thus, causing a negative ripple effect to other users that share the channels; sequential detection algorithms in the storage controller being insufficient to optimize skip-sequential access patterns; host-based prestaging controls being awkward to use and sometimes leading to the wrong decisions about prestaging; and occasionally tables and indexes being reorganized in order to improve scan performance. Such reorganization activity represents a large amount of overhead to the system and work for the data administrator. Similarly, database objects occasionally need to be recovered and as a result, the data availability is sensitive to the performance of List Prefetch.

The illustrative embodiments provide for retrieving records into a main memory. The illustrative embodiments receive a first number of gaps and a first total gap size for a list of records from a database subsystem. The illustrative embodiments determine a first average gap size using the first number of gaps and the first total gap size. The illustrative embodiments determine if the first average gap size is greater than a prestaging threshold value. The illustrative embodiments set a prestaging flag for the list of records in response to the first average gap size being equal to or less than the prestaging threshold value. The illustrative embodiments then retrieve the list of records into the main memory using prestaging.

In the illustrative embodiments, the list of records may be retrieved into the main memory without using prestaging in response to the first average gap size being greater than the prestaging threshold value. In the illustrative embodiments, for each gap between two records in the list of records, a gap size between a first record and a second record may be calculated. In the illustrative embodiments, an address word may be constructed that identifies the location of a first buffer in the main memory where the second record is to be stored in response to the gap size being zero.

In the illustrative embodiments, a determination may be made as to whether the gap size is greater than a maximum gap filling threshold value in response to the gap size being greater than zero. In the illustrative embodiments, a first address word may be constructed for the gap that identifies the length of the gap and includes a skip flag for the gap between the two records in response to the gap size being equal to or less than the maximum gap filling threshold value. In the illustrative embodiments, a second address word may be constructed that identifies the location of a buffer in the main memory where the second record is to be stored.

In the illustrative embodiments, the number of gaps may be incremented by a value of one and the total gap size may be incremented by the size of the gap in response to the gap size being greater than the maximum gap filling threshold value. In the illustrative embodiments, an embedded locate record may be inserted and the second address word may be constructed that identifies the location of a buffer in the main memory where the second record is to be stored. In the illustrative embodiments, the records in the list of records may be retrieved into one or more buffers in the main memory that are identified by one or more address words.

In the illustrative embodiments, a record identifier list may be received and a first record in the record identifier list may be added to a set of records in the list of records. In the illustrative embodiments, a determination may be made as to whether a set of records in the list of records equals a maximum prefetch quantity. In the illustrative embodiments, the list of records may be sent to at least one of an I/O driver or a storage controller in response to the set of records meeting the maximum prefetch quantity.

In the illustrative embodiments, a next record may be fetched from the record identifier list in response to the set of records failing to meet the maximum prefetch quantity. In the illustrative embodiments, a current gap size may be calculated between the first record and the next record. In the illustrative embodiments, a determination may be made as to whether the current gap size is less than a minimum gap size value. In the illustrative embodiments, the next record may be added to the set of records in the list of records in response to the current gap size being less than the minimum gap size value.

In the illustrative embodiments, a determination may be made as to whether the second number of gaps is greater than a minimum number of gaps in response to the current gap size failing to be less than the minimum gap size value. In the illustrative embodiments, a determination may be made as to whether the current gaps size exceeds a moving average gap size by a threshold delta in response to the second number of gaps being greater than a minimum number of gaps. In the illustrative embodiments, the list of records may be truncated in response to the current gaps size exceeding the moving average gap size by the threshold delta.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
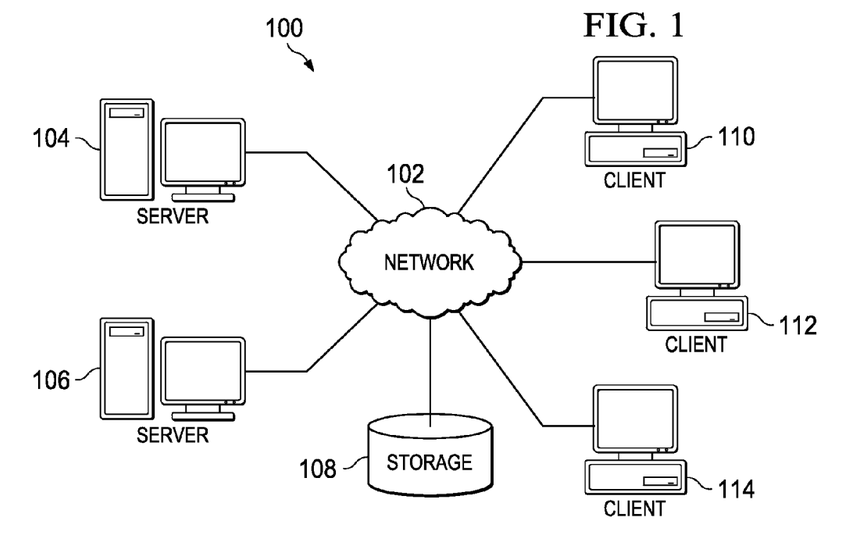
FIG. 1 is an exemplary representation of an exemplary distributed data processing system in which aspects of the illustrative embodiments may be implemented.
Figure 2:
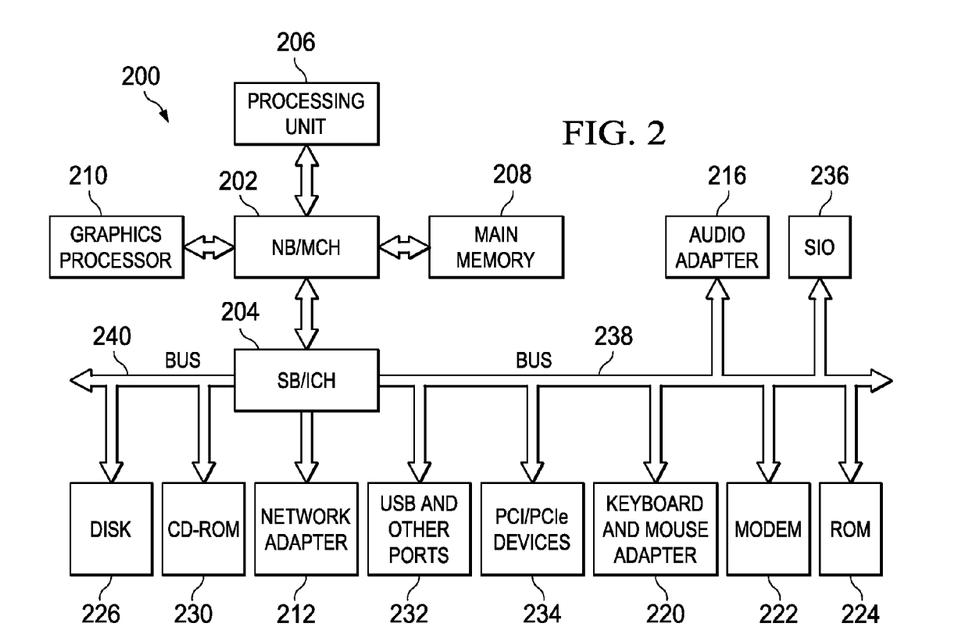
FIG. 2 is a block diagram of an exemplary data processing system in which aspects of the illustrative embodiments may be implemented.

The illustrative embodiments provide for improving the performance of skip-sequential processing of records using Adaptive List Prefetch. As such, the mechanisms of the illustrative embodiments are especially well suited for implementation within a distributed data processing environment and within, or in association with, data processing devices, such as servers, client devices, and the like. In order to provide a context for the description of the mechanisms of the illustrative embodiments, FIGS. 1-2 are provided hereafter as examples of a distributed data processing system, or environment, and a data processing device, in which, or with which, the mechanisms of the illustrative embodiments may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer$^{SM}$ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be a bus system comprising one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide mechanisms for improving the performance of skip-sequential processing of records using Adaptive List Prefetch. In the illustrative embodiments, various modules within an application identify a predetermined list of records that are intended to be read. The various modules sort the records in an ascending order with respect to disk addresses, so that the records may be read in skip-sequential order. The various modules group the records into input/out operations (I/Os) and calculate a density of the groups of records. Using the density of groups of records, the various modules determine whether or not to request prestaging in processing the records. Then the various modules retrieve the records from storage.

Much of the technology described in the illustrative embodiments is described in terms of DB2 for z/OS, which is a relational database subsystem running on a z/OS operating system. The illustrative embodiments are also described in terms of the Extended Count Key Data (ECKD) I/O architecture. ECKD is an I/O channel architecture that is employed by the z/OS operating system. The z/OS operating system supports storage controllers that support the ECKD architecture. However, the illustrative embodiments are not meant to be exclusive to DB2, z/OS, or ECKD. To the contrary, the mechanisms of the illustrative embodiment may be used with other database applications, operating systems, and channel architectures without departing from the spirit and scope of the present invention.

Figure 3:
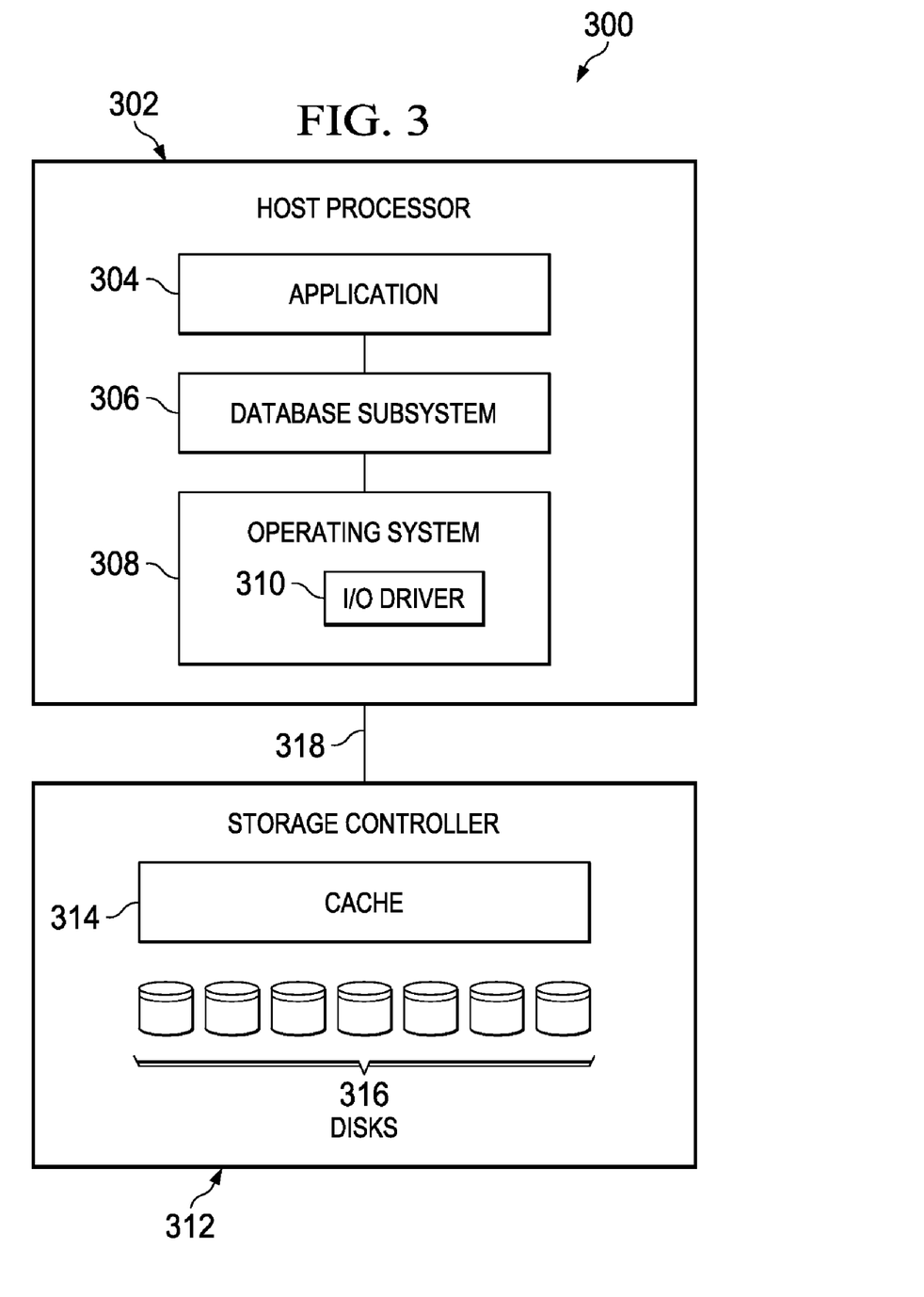
FIG. 3 illustrates the exemplary components of an Adaptive List Prefetch mechanism in accordance with an illustrative embodiment.

FIG. 3 illustrates the exemplary components of an Adaptive List Prefetch mechanism in accordance with an illustrative embodiment. The illustrative embodiments use the term records, which may also be referred to as pages or blocks. In the illustrative embodiment, ECKD architecture 300 may comprise host processor 302 coupled to storage controller 312 via high speed channel 318. Host processor 302 may comprise application 304, database subsystem 306, and operating system 308. Storage controller 312 may comprise cache 314 and disks 316. In this illustrative embodiment, data may be read in a skip-sequential fashion from disks 316, which may be, for example, disks in a Redundant Array of Independent Drives (or Disks) (RAID) 5 array which comprises eight disks. Operating system 308 may also comprise I/O driver 310. I/O driver 310 may be responsible for constructing channel programs to communicate with storage controller 312 via high speed channel 318.

I/O driver 310 may be responsible for generating a channel program. A channel program may provide the command for which various I/O requests read or write data to disks 316. The channel program may comprise a linear sequence of 8-byte channel command words (CCWs). Each CCW may comprise a one-byte operation code (opcode), a 4-byte memory address, a 2-byte length field, and/or 8 flags. The memory address is a "real" address, not "virtual" address, because high speed channel 318 may not recognize virtual addresses. To read one record from disks 316, the channel may require two CCWs, such as a Prefix CCW a Read CCW, or the like.

The Prefix CCW may point to a parameter list, which combines two parameter areas known as the Define Extent parameters and Locate Record parameters. The Locate Record parameters may comprise the target disk address of disks 316 with regard to the I/O operation in the form of a cylinder number, track number, and relative record number within the track. The Define Extent parameters may comprise a flag byte which allows for host processor 302 to request that storage controller 312 employ prestaging. For example, if the DB2's SEQCACH parameter is set to SEQ, then the Prefix CCW parameter will indicate prestaging.

For a read operation, following the Prefix CCW may be one or more Read CCWs. All of the operations that follow the Prefix CCW may be considered to be part of the Locate Record domain. Within the scope of one Locate Record domain, every record that is read may be contiguous. If non-contiguous records need to be read, a Locate Record CCW may be inserted to specify a new target disk address for disks 316. Extra Locate Record CCWs used in this manner are sometimes called imbedded Locate Records and records subsequently read may be part of the new Locate Record domain.

ECKD architecture 300 may support many types of read commands. One known read command used to achieve optimal performance is called Read Track Data CCW. Read Track Data CCW is commonly used to improve channel performance in conjunction with a Modified Indirect Address Word (MIDAW). Read Track Data enables multiple records to be read from the same track of disks 316 using a single CCW. If two records reside on different tracks, then two Read Track Data CCWs may be necessary to read the records. Within one Locate Record domain, every record that is read may be required to be contiguous on disks 316 unless the SKIP flag is used. If two records are not consecutive, I/O driver 310 may insert another Locate Record CCW to position to the second record.

The MIDAW is used to identify the location of the buffer(s) in the main memory where the records that are retrieved from disks 316 will be stored. Each MIDAW may comprise 16 bytes which includes an 8-byte buffer pointer, a 4-byte length field, and a flag byte. Generally, the length field in the MIDAW is never greater than 4K because the real 4K frames in operating system 308, such as z/OS, are not guaranteed to be contiguous. The MIDAW may not require that the pointers begin on a 4K boundary nor may the MIDAW require that the sum of the pointer and length be a 4K multiple.

One of the flags in the MIDAW may be called a SKIP flag. The SKIP flag may be used to discard part of a record or, in the case of Read Track Data CCW, to discard part of a track. In other words, although storage controller 312 reads the records, high speed channel 318 may discard the skipped data, ignoring the memory address in the MIDAW. Generally, the length field of a MIDAW never exceeds 4K because the "real" frame size used by operating system 308 is 4K, and two frames that make up a "virtual" buffer are not guaranteed to be contiguous in disks 316. However, in the case of skipped records, the length of one MIDAW may in fact exceed 4K.

The MIDAW SKIP flag may also be useful for optimizing high speed channel 318 rather than for optimizing disks 316. The definition of a "high speed" channel may be relative to the speed of disks 316 and the processing time of storage controller 312. As the speed of disks 316 and storage controller 312 improve, the value of the SKIP flag may change if the channel speeds do not also improve.

Figure 4:
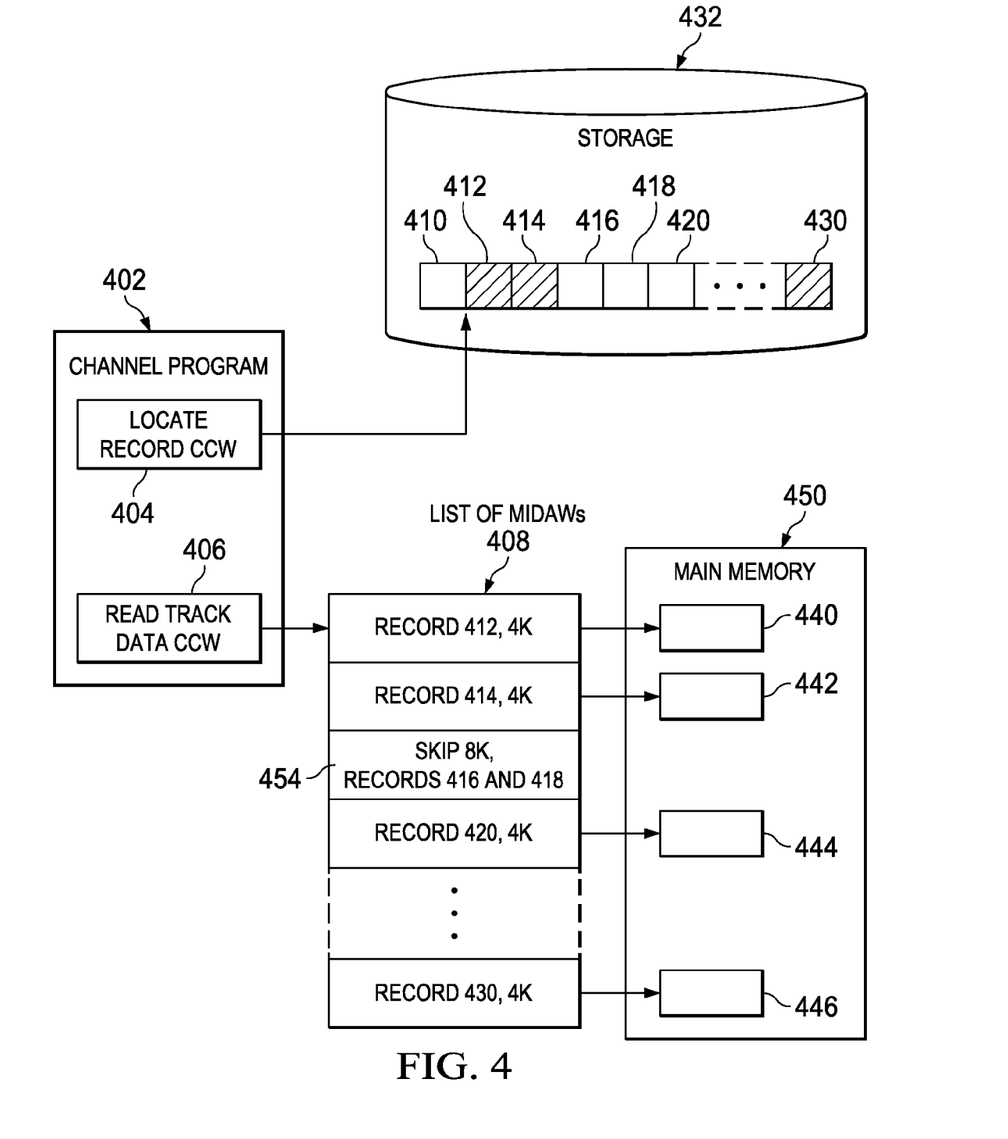
FIG. 4 illustrates an example of using a SKIP flag with a Read Track Data CCW in accordance with an illustrative embodiment.

A simple way to understand why and how the SKIP flag may improve performance is by understanding that high speed channel 318 performance is very sensitive to the number of CCWs in the channel program. FIG. 4 illustrates an example of using a SKIP flag with a Read Track Data CCW in accordance with an illustrative embodiment. In FIG. 4 channel program 402 may include Locate Record 404 and Read Track Data CCW 406. Locate Record 404 identifies a location of the first record, record 412, that is to be read from disk 432 with relation to Read Track Data CCW 406. Read Track Data CCW 406 uses list of MIDAWs 408 to identify buffers 440-446 in main memory 450 where records 412, 414, and 420 are to be stored when records 412, 414, and 420 are read from disk 432. List of MIDAWs 408 may also include SKIP flag 454 that indicates that records 416 and 418 are to be skipped.

If list of MIDAWs 408 does not use SKIP flag 454, two Read Track Data CCWs may be used plus an embedded Locate Record CCW to reposition to record 420 for a total of 3 CCWs. As is shown in FIG. 4, using SKIP flag 454 to skip records 416 and 418, only requires one CCW. The same number of CCWs may be needed if database subsystem 306 needs to read record 430 instead of record 420, but in known systems consisting of 4 Gbit/sec high speed channels, reading 16K requires more channel time than the cost of the two extra CCWs. Therefore, a decision is to be made whether database subsystem 306 should read the records that are indicated to be skipped, records 416 and 418, thereby avoid using extra CCWs or to actually skip records 416 and 418 thereby using extra CCWs and reducing the channel time of high speed channel 318. When the number of records indicated to be skipped is small, such as 1 or 2 records, it may be beneficial to overall system performance for database subsystem 306 to read the records with no extra CCWs, which is referred to as "Gap Filling" in the illustrative embodiments.

In order to solve the issues with using CCWs, the illustrative embodiments provide an Adaptive List Prefetch mechanism. The adaptive list prefetch mechanism may be applied, for example, to table scans, index scans, row identifier (RID) list scans, fast log apply scans, or the like. While table scans use a Sequential Prefetch, operating system 308 and storage controller 312 may recognize a Sequential Prefetch in much the same way as a List Prefetch is recognized. The only difference between a List Prefetch and a Sequential Prefetch is the distribution of the records within disks 316. That is, records read by Sequential Prefetch are more likely to be contiguous or dense than are records read by a List Prefetch.

The Adaptive List Prefetch mechanism employed in ECKD architecture 300 may be one or more of: an algorithm to determine when to use prestaging, an algorithm to exploit the MIDAW SKIP flag by using gap filling, and/or an algorithm to truncate the List Prefetch quantity used for RID list scans. Using one or more of these algorithms may result in an improvement in the performance of table scans, index scans, RID list scans, or the like, and additionally may result in a reduction in the frequency of reorganization of indexes and tables. Further, using any or all of these algorithms may result in improved data availability.

In the illustrative embodiments, the algorithm to determine when to use prestaging and the algorithm to exploit the MIDAW SKIP flag by using gap filling may be implemented in I/O driver 310 and/or storage controller 312; however the following description is directed only to I/O driver 310. In order to determine when to use prestaging and when to use gap filling for a list of records received from database subsystem 306, I/O driver 310 first initializes two counters; a number of gaps counter and a total gap size counter. I/O driver 310 fetches a first record from the list of records sent by database subsystem 306 and changes the identification of the first record to be recognized as the previous record. For each Locate Record CCW that needs to be constructed, I/O driver 310 constructs the Locate Record CCW and stores the disk address for the previous record in a Locate Record parameter block. I/O driver 310 also constructs a Read Track Data CCW, pointing it at the first Modified Indirect Address Word (MIDAW).

I/O driver 310 then constructs all of the MIDAWs for the Read Track Data CCW. While there may be multiple Read Track Data CCWs for one Locate Record domain, the illustrative embodiments are described in terms of only one Read Track Data CCW for one Locate Record domain. That is, all of the records for a given Locate Record domain reside on the same track. I/O driver 310 constructs the MIDAW for the previous record; that is, the MIDAW is initialized to point at the buffer supplied by database subsystem 306. Then, I/O driver 310 determines if there is another record in the list of records, if any. If I/O driver 310 determines that there is another record, I/O driver 310 calculates a gap size of the next record and changes the identification of the next record to be recognized as the previous record. I/O driver 310 then determines if the gap size is zero. If I/O driver 310 determines that the gap size is zero, meaning that the previous and next records were adjacent, then I/O driver 310 constructs all of the MIDAWs for the Read Track Data CCW, as described previously.

If I/O driver 310 determines that the gap size is not zero, I/O driver 310 determines if the gap size is greater than a predetermined maximum gap filling threshold, for example, 8K. In the illustrative embodiments, 8K is the maximum gap size beyond which the gap should not be filled. If I/O driver 310 determines that the determined gap size is not greater than the predetermined maximum gap filling threshold, I/O driver 310 constructs one MIDAW for the gap records, sets a length field to the length of the gap, and sets a SKIP flag. Then, I/O driver 310 constructs all of the MIDAWs for the Read Track Data CCW, as described previously.

If I/O driver 310 determines that the gap size is greater than the predetermined maximum gap filling threshold, I/O driver 310 increments the number of gaps counter by 1 and the total gap size counter by the size of the gap. Then, I/O driver 310 constructs the Locate Record CCW and stores the disk address for the previous record in a Locate Record parameter block. I/O driver 310 also constructs a Read Track Data CCW, pointing it at the first Modified Indirect Address Word (MIDAW), as described previously.

If I/O driver 310 determines there are no other records in the list of records, I/O driver 310 calculates an average gap size by dividing the total gap size from the total gap size counter by the number of gaps from the number of gaps counter. I/O driver 310 then determines if the average gap size is greater than a predetermined prestaging threshold value. If the average gap size is not greater than the predetermined prestaging threshold value, then I/O driver 310 sets a prestaging flag for the list of records and informs high speed channel 318 to start the I/O operation. If the average gap size is greater than the predetermined prestaging threshold value, then I/O driver 310 informs high speed channel 318 to start the I/O operation.

In another embodiment, if the I/O architecture allows for it, instead of I/O driver 310 setting the prestaging flag, I/O driver 310 may store the average gap size in the Prefix CCW so that storage controller 312 may make a determination as to whether prestaging should be performed using an algorithm similar to the one described previously as used by I/O driver 310. In yet another alternative embodiment, storage controller 312 may inform operating system 308, for example via a call initiated by operating system 308 or database subsystem 306, of the predetermined prestaging threshold value that should be used by I/O driver 310. The advantage to the alternative embodiments may be that a different prestaging threshold value could be used by different storage controllers, which may be able to determine a more appropriate prestaging threshold value than the prestaging threshold value used by I/O driver 310. Further, storage controller 312 may adjust the prestaging threshold value over time as conditions associated with storage controller 312 change.

The essential reason that the average gap size is a useful metric is because it neatly summarizes the future data access pattern. The most obvious unit to use for this metric is bytes, but an attractive alternative to bytes is tracks. The purpose of the metric is to estimate the relative performance of, for example, a List Prefetch with and without prestaging. In effect, the average gap size provides an estimate of the relative performance. While the performance with prestaging is a function of the total number of tracks prestaged, the performance without prestaging depends on whether storage controller 312 uses "record level" caching or "track level" caching. When two records reside on the same track, track level caching may be superior to record level caching. So, if I/O driver 310 could assume that storage controller 312 uses track level caching, then it may be best to measure the gap size in units of tracks. If it is desired that I/O driver 310 bias itself towards track level caching, then whenever two records are read from the same track, the gap may be ignored.

When considering a metric such as the "average gap size", it may also be important to consider some boundary conditions. A pure sequential I/O request is one where there are no gaps. The "average" gap size is undefined when there are no gaps. Obviously the average gap size cannot be computed in this case, since division by 0 will fail. If there are no gaps, then it is likely that the I/O pattern is pure sequential, not skip-sequential, although the I/O driver cannot determine if there are gaps between one I/O request and the next. If the I/O pattern is pure sequential, most storage controllers will detect it and automatically initiate prestaging whether or not the host requests prestaging.

The implementations described above for I/O driver 310, and optionally storage controller 312, are generally sufficient to meet most of the objectives of an Adaptive List Prefetch. However, for scans, such as RID list scans, if the records derived from the RID list scan are uniformly distributed, then no changes to database subsystem 306 are needed for Adaptive List Prefetch. Furthermore, unless Adaptive List Prefetch is implemented in I/O driver 310, changing database subsystem 306 may be useless. However, changes to database subsystem 306 in conjunction with the changes to I/O driver 310 may be desirable to improve the performance when the records are not uniformly distributed. In this case, database subsystem 306 may be used to analyze the clustering of the records, and try to determine the boundaries between the clusters. The List Prefetch I/Os can then be grouped along these boundaries.

For example, if there are 1000 records in an RID list. Database subsystem 306 will traverse this list of records and construct a list of say 32 records and then call a DB2 Buffer Manager to perform a List Prefetch I/O for those 32 records. In this case, 32 I/O List Prefetch I/O operations will be executed to read all 1000 records. The 32 records constitute the prefetch quantity, but out of these 32 records, some records may be buffer hits and the resulting I/O may read less than 32 records.

The choice for the prefetch quantity is normally a fixed amount and the distribution of records is not considered. Adaptive list prefetch introduces a "truncation" algorithm that does consider the distribution of records. In some cases, the prefetch quantity should be lowered, or in other words truncated, in order to optimize the prestaging.

Arbitrarily lowering the prefetch quantity comes at a CPU cost, because the lower the prefetch quantity is, the more I/Os are required; the more I/Os that are executed, the more CPU time is used. The reason for sometimes truncating the prefetch quantity may be to enable alternating I/Os to use prestaging and not use prestaging. In other words, if the 32 records were divided into two I/Os of 16 records each and if both I/Os used prestaging, it may have been better not to truncate. Likewise if neither I/O used prestaging, it may have been better not to truncate. If all that were needed was a way to divide the 32 records into some number of I/Os, then I/O driver 310 could perform the division. Only database subsystem 306 has the entire list of 1000 records, which is necessary to group the records along boundaries other than chunks of 32 records.

For example, suppose that the first 20 records are dense and would benefit from prestaging, and the next 25 records are sparse and would be harmed by prestaging. Then suppose that this pattern repeats itself over and over again. In this case, the ideal truncation algorithm would alternate the prefetch quantity between 20 records and 25 records.

Some form of "cluster analysis" of the RID list may be warranted, but it is costly to re-traverse the RID list or any part of it more than once. So, a self-imposed restriction on Adaptive List Prefetching is that the RID list cannot be re-traversed. In other words, the traverse may only move forward in the list, never backwards.

Another self-imposed restriction is that the prefetch quantity may be above a specified minimum in order to avoid an excessive number of I/Os. It is acknowledged that some additional CPU time is required when increasing the number of I/Os, but the additional CPU time should be small compared to the List Prefetch I/O time. As the hardware technology improves, the minimum prefetch quantity should be re-evaluated.

List Prefetch is typical of database operations, and it is the database subsystem that determines the prefetch quantity. As mentioned above, ordinarily the prefetch quantity is a fixed amount, and does not take into consideration the record density. Adaptive List Prefetch may not require any changes to the database subsystem, but if the record density is non-uniform, it may be desirable to modify the database subsystem in order to vary the prefetch quantity from one List Prefetch operation to the next.

In order to determine whether to truncate the List Prefetch quantity used for RID list scans, database subsystem 306 determines a RID list, which may be very large, for example 1000 records. Database subsystem 306 initializes two counters, a number of gaps counter and a total gap size counter. Database subsystem 306 fetches a first record from a list of records and changes the identification of the first record to be recognized as the previous record. Database subsystem 306 adds the previous record to a record list and determines if the record list size is equal to the maximum prefetch quantity, for example 32 records. If the record list is less than the maximum prefetch quantity, then database subsystem 306 fetches the next record number from the RID list. Database subsystem 306 then determines if the end of the RID list has been reached. If database subsystem 306 determines that the end of the RID list has not been reached, then database subsystem 306 changes the identification of the next record to be recognized as the previous record. Database subsystem 306 then calculates a gap size. Database subsystem 306 then determines if the gap size is less than a predetermined minimum value. If database subsystem 306 determines that the gap size is less than a predetermined minimum value, then database subsystem 306 does not count the gap size, adds the previous record to a record list and determines if the maximum prefetch quantity, for example 32 records, has been reached, as described previously. The reason for ignoring very small gaps is that they are likely to be "filled" by I/O driver 310 as described previously and by ignoring these gaps prefetch quantity will be increased which may reduce CPU time.

If database subsystem 306 determines that the gap size is larger than or equal to the predetermined minimum value, database subsystem 306 increments the number of gaps counter by 1 and the total gap size counter by the size of the gap. Database subsystem 306 then determines if the number of gaps that have been encountered is equal to a minimum number of gaps. If database subsystem 306 determines that the number of gaps encountered is equal to the minimum number of gaps, then database subsystem 306 calculates an average gap size by dividing the total gap size from the total gap size counter by the number of gaps from the number of gaps counter, adds the previous record to a record list and determines if the maximum prefetch quantity, for example 32 records, has been reached, as described previously. If database subsystem 306 determines that the number of gaps is not equal to the minimum number of gaps, then database subsystem 306 determines if the number of gaps that have been encountered is less than the minimum number of gaps. If database subsystem 306 determines that the number of gaps that have been encountered is less than the minimum number of gaps, database subsystem 306 adds the previous record to a record list and determines if the maximum prefetch quantity, for example 32 records, has been reached, as described previously. If database subsystem 306 determines that the number of gaps that have been encountered is greater than or equal to the minimum number of gaps, then database subsystem 306 calculates a moving average gap size by dividing the total gap size from the total gap size counter by the number of gaps from the number of gaps counter. The term "moving average" is used to reflect the fact that this number might be re-evaluated and changed each time a new record is added to the record list.

At this point, database subsystem 306 determines if the current gap size exceeds the moving average gap size by a predetermined threshold delta. If the current gap size fails to exceed the moving average gap size by the predetermined threshold delta, then database subsystem 306 adds the previous record to a record list and determines if the maximum prefetch quantity, for example 32 records, has been reached, as described previously. If database subsystem 306 determines that the current gap size exceeds the moving average gap size by the predetermined threshold delta, then database subsystem 306 truncates the record list. After database subsystem 306 truncates the record list thereby constructing a small list of records, if database subsystem 306 determines that the record list equals the maximum prefetch quantity, or if database subsystem 306 determines that the end of the RID list has been reached, database subsystem 306 sends the small list of records to a Buffer Manager. The Buffer Manager will call I/O driver 310, or optional storage controller 312, to read the records. When I/O driver 310 completes the read of the records, database subsystem 306 processes the data. Then database subsystem 306 determines if the end of the RID list has been reached. If database subsystem 306 determines that the end of the RID list has not been reached, then database subsystem 306 resumes traversing the RID list, as described previously. If database subsystem 306 determines that the end of the RID list has been reached, the processing of the data terminates.

Therefore, the illustrative embodiments provide mechanisms for improving the performance of skip-sequential processing of records using Adaptive List Prefetch. Using an Adaptive List Prefetch mechanism may minimize the elapsed time of performing read operations, minimize control unit processing overhead, minimize control unit cache usage, minimize buffer pool usage, minimize channel usage, and/or minimize host CPU overhead.

FIGS. 5A-6B are flowcharts that illustrate the operation of an Adaptive List Prefetch application according to the invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

Figure 5A:
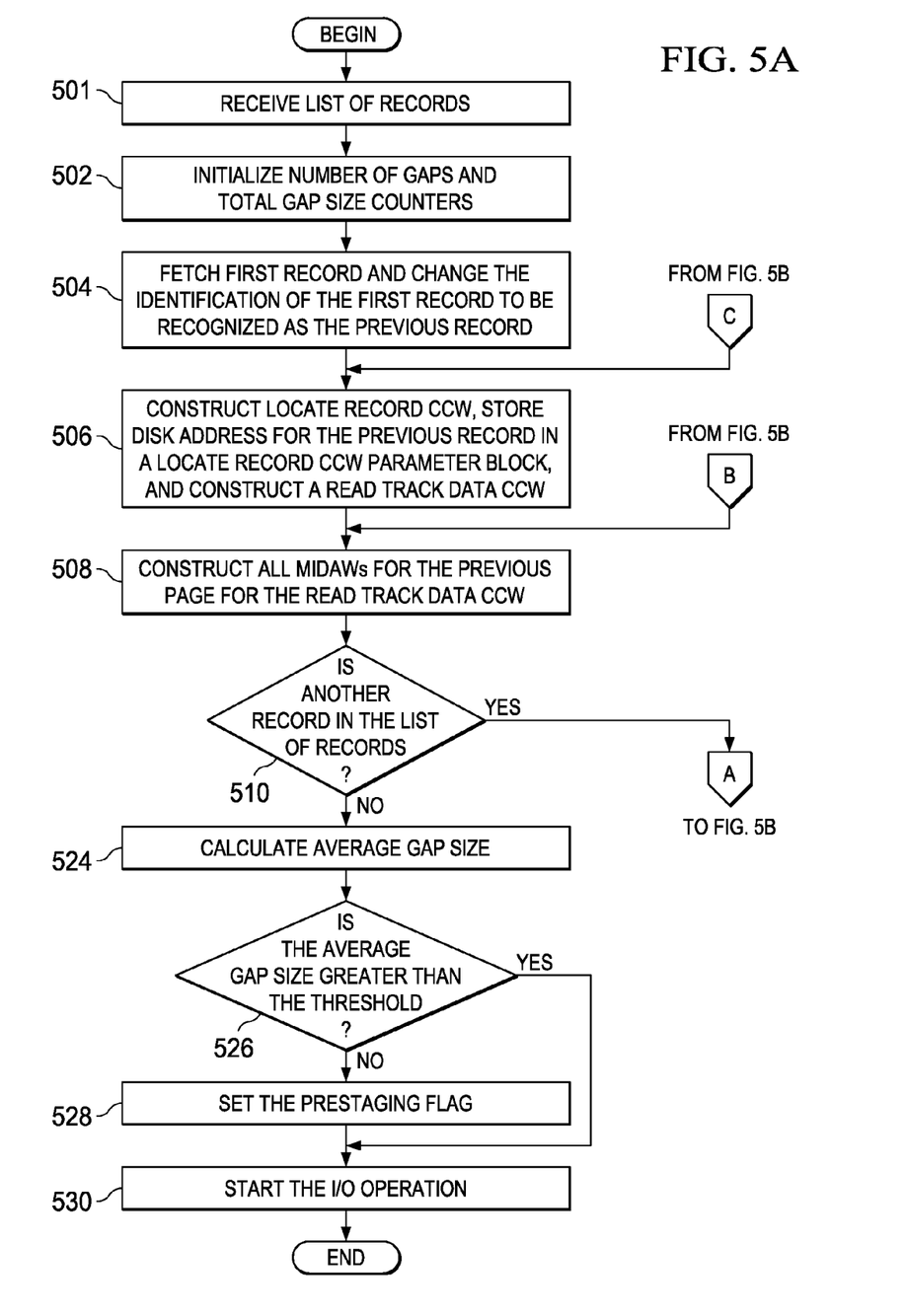
FIGS. 5A and 5B depict an exemplary operation of an Adaptive List Prefetch mechanism to determine when to use prestaging and when to use gap filling in accordance with an illustrative embodiment.
Figure 5B:
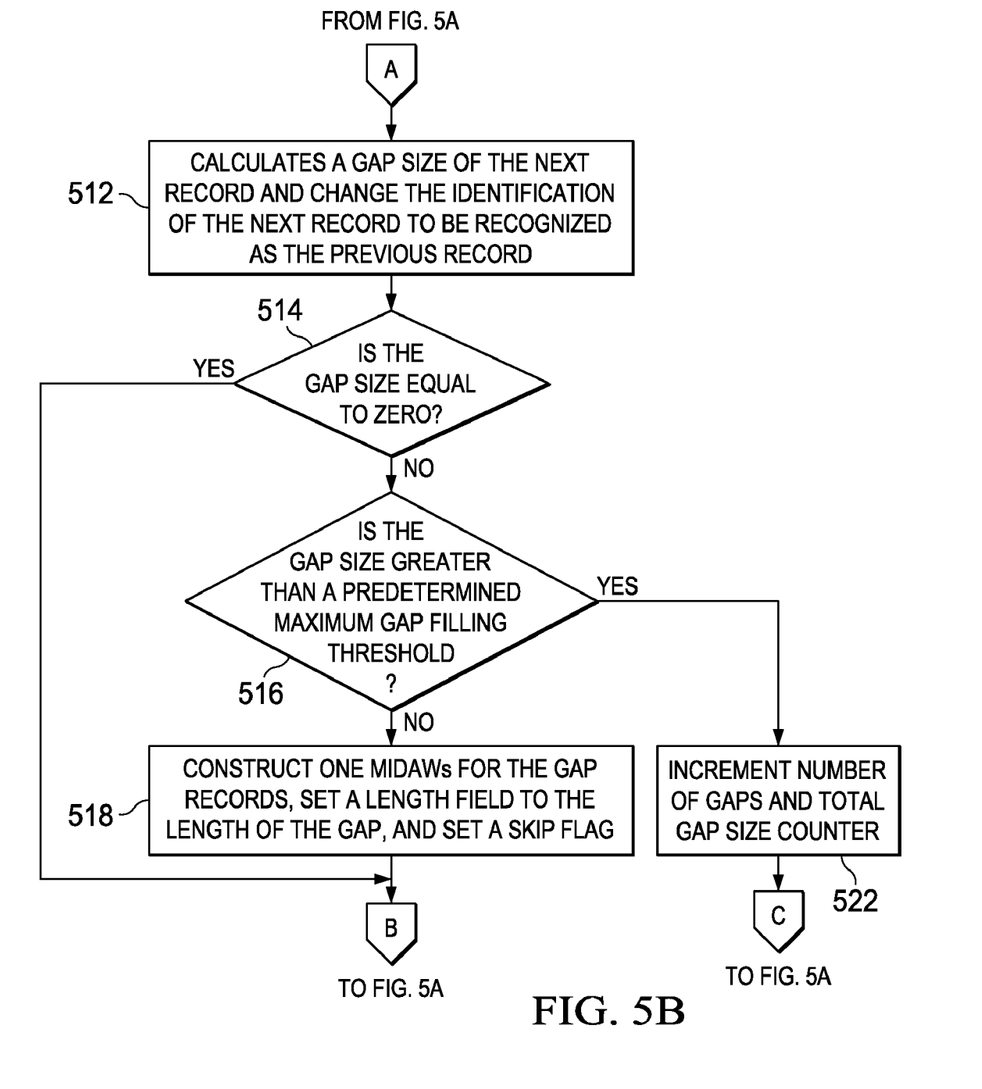

FIGS. 5A and 5B depicts an exemplary operation of an Adaptive List Prefetch mechanism to determine when to use prestaging and when to use gap filling in accordance with an illustrative embodiment. Again, the algorithm to determine when to use prestaging and the algorithm to exploit the MIDAW SKIP flag by using gap filling may be implemented in an I/O driver such as I/O driver 310 of FIG. 3, and/or a storage controller, such as storage controller 312 of FIG. 3. Thus, while the operation may be performed by an I/O driver or a storage controller, the following operation is described in terms of the I/O driver performing the operation. As the operation begins, an I/O driver receives a list of records to be processed from a database subsystem (step 501). The I/O driver initializes two counters, a number of gaps counter and a total gap size counter (step 502). The I/O driver fetches a first record from a list of records sent by a database subsystem and changes the identification of the first record to be recognized as the previous record (step 504). For each Locate Record CCW that needs to be constructed, the I/O driver constructs the Locate Record CCW, stores the disk address for the previous record in a Locate Record parameter block, and constructs a Read Track Data CCW, pointing the Read Track Data CCW at the first Modified Indirect Address Word (MIDAW) (step 506).

The I/O driver then constructs all of the MIDAWs for the Read Track Data CCW (step 508). The I/O driver then determines if there is another record in the list of records (step 510). If at step 510 the I/O driver determines that there is another record, the I/O driver calculates a gap size of a next record from the list of records and changes the identification of the next record to be recognized as the previous record (step 512). The I/O driver then determines if the gap size is zero (step 514). If at step 514 the I/O driver determines that the gap size is zero, meaning that the previous and next records were adjacent, then operation returns to step 508 thereafter.

If at step 514 the I/O driver determines that the gap size is not zero, the I/O driver determines if the gap size is greater than a predetermined maximum gap filling threshold (step 516). If at step 516 the I/O driver determines that the gap size is less than or equal to the predetermined maximum gap filling threshold, the I/O driver constructs one MIDAWs for the gap records, sets a length field to the length of the gap, and sets a SKIP flag (step 518), with the operation returning to step 508 thereafter. If at step 516 the I/O driver determines that the gap size is greater than the predetermined maximum gap filling threshold, the I/O driver increments the number of gaps counter by 1 and the total gap size counter by the size of the gap (step 522), with the operation returning to step 506 thereafter.

Figure 6A:
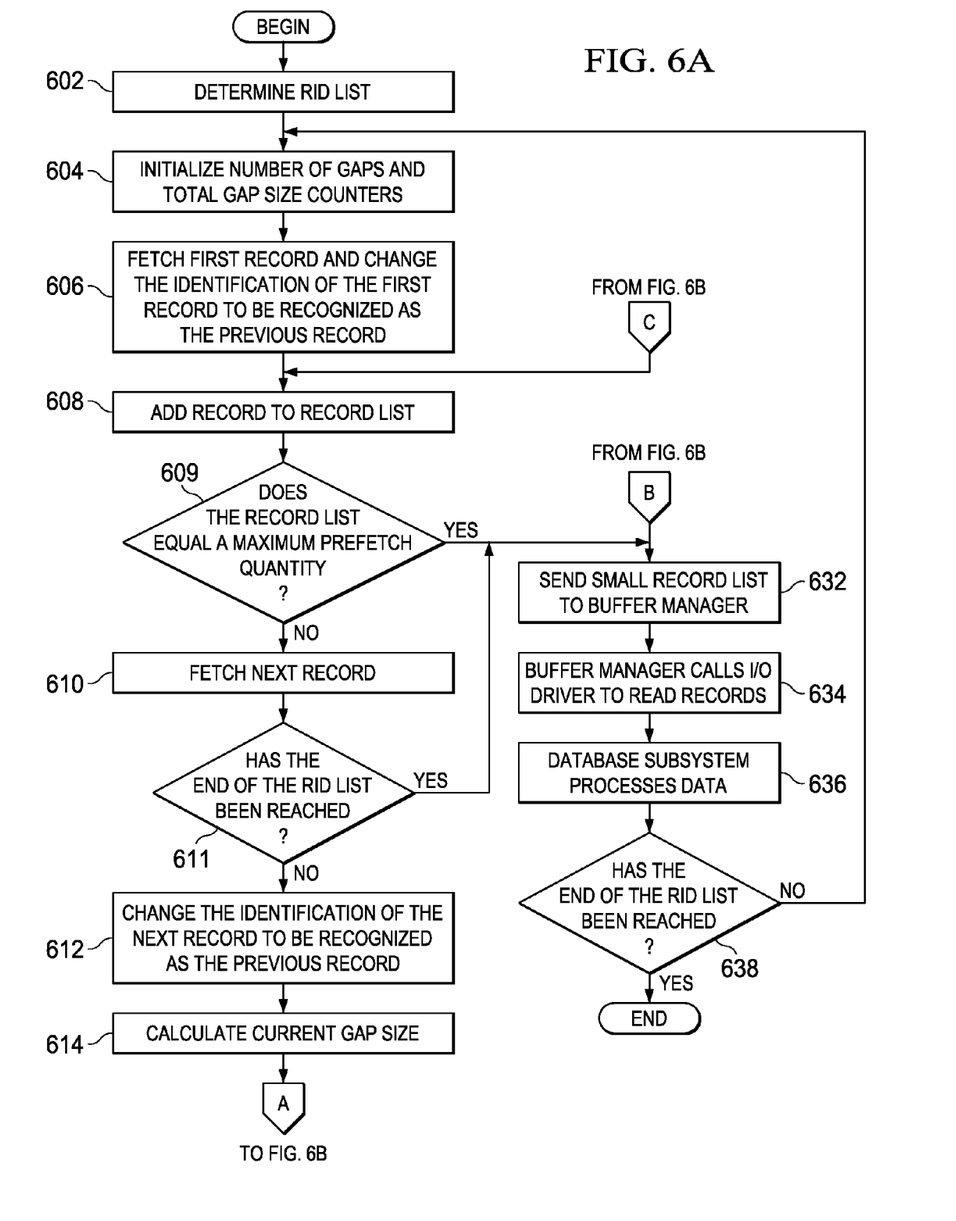
FIGS. 6A and 6B depict an exemplary operation of an Adaptive List Prefetch mechanism to determine when to truncate a list of records in accordance with an illustrative embodiment.
Figure 6B:
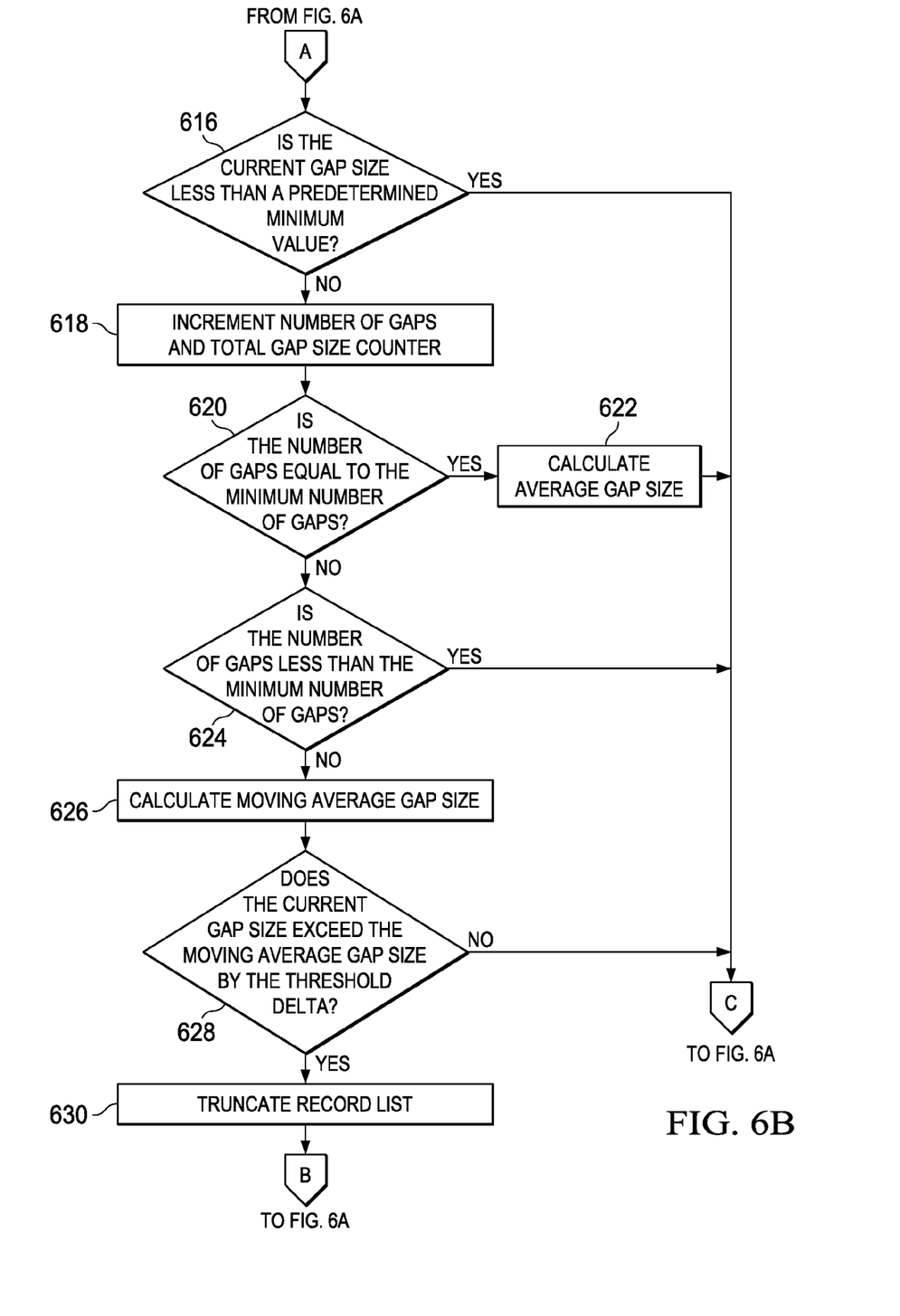

Returning to step 510, if the I/O driver determines there are no other records in the list of records, the I/O driver calculates an average gap size by dividing the total gap size from the total gap size counter by the number of gaps from the number of gaps counter (step 524). The I/O driver determines if the average gap size is greater than a predetermined prestaging threshold value (step 526). If at step 526 the I/O driver determines that the average gap size is not greater than the threshold, then the I/O driver sets a prestaging flag for the list of records (step 528). The I/O driver then informs the high speed channel to start the I/O operation (step 530), with the operation ending thereafter. If at step 526 the I/O driver determines that the average gap size is greater than the threshold, the I/O driver then informs the high speed channel to start the I/O operation (step 530), with the operation ending thereafter FIGS. 6A and 6B depicts an exemplary operation of an Adaptive List Prefetch mechanism to determine when to truncate a list of records in accordance with an illustrative embodiment. As the operation begins, the database subsystem determines a row identifier (RID) list of records (step 602). The database subsystem then initializes two counters, a number of gaps counter and a total gap size counter (step 604). The database subsystem fetches a first record from a list of records and changes the identification of the first record to be recognized as the previous record (step 606). The database subsystem adds the previous record to a record list (step 608) and determines if the record list equals a maximum prefetch quantity (step 609). If at step 609 the database subsystem determines that the record list does not equal the maximum prefetch quantity, then the database subsystem fetches the next record from the RID list (step 610). Then the database subsystem determines if the end of the RID list has been reached (step 611). If at step 611 the database subsystem determines that end of the RID list has not been reached, then the database subsystem changes the identification of the next record to be recognized as the previous record (step 612).

The database subsystem then calculates a gap size (step 614). Database subsystem then determines if the gap size is less than a predetermined minimum value (step 616). If at step 616 the database subsystem determines that the gap size is less than a predetermined minimum value, then the database subsystem does not count the gap size and the operation returns to step 608. If at step 616 the database subsystem determines that the gap size is larger than or equal to the predetermined minimum value, the database subsystem increments the number of gaps counter by 1 and the total gap size counter by the size of the gap (step 618). The database subsystem then determines if the number of gaps that have been encountered is equal to a minimum number of gaps (step 620). If at step 620 the database subsystem determines that the number of gaps is equal to the minimum number of gaps, then the database subsystem calculates an average gap size by dividing the total gap size from the total gap size counter by the number of gaps from the number of gaps counter (step 622) with the operation returning to step 608 thereafter. If at step 620 the database subsystem determines that the number of gaps is not equal to the minimum, then the database system determines if number of gaps that have been encountered is less than the minimum number of gaps (step 624).

If at step 624 the database subsystem determines that the number of gaps that have been encountered is less than the minimum number of gaps, then the operation returns to step 608. If at step 624 the database subsystem determines that if the number of gaps that have been encountered is greater than the minimum number of gaps, then the database subsystem calculates a moving average gap size by dividing the total gap size from the total gap size counter by the number of gaps from the number of gaps counter (step 626).

At this point, the database subsystem determines if the current gap size exceeds the moving average gap size by a predetermined threshold delta (step 628). If at step 628 the database subsystem determines that the current gap size fails to exceed the moving average gap size by a predetermined threshold delta, then the operation returns to step 608. If at step 628 the database subsystem determines that the current gap size exceeds the moving average gap size by the predetermined threshold delta, then the database subsystem truncates the record list (step 630). After the database subsystem truncates the record list thereby constructing a small list of records at step 630, if at step 609 the database subsystem determines that the record list does equals the maximum prefetch quantity, or if at step 611 the database subsystem determines that the end of the RID list has been reached, the database subsystem sends the small list of records to a Buffer Manager (step 632). The Buffer Manager will call the I/O driver to read the records (step 634). When the I/O driver completes the read of the records, the database subsystem processes the data (step 636). Then the database subsystem determines if the end of the RID list has been reached (step 638). If at step 638 the database subsystem determines that the end of the RID list has not been reached, then the operation returns to step 604. If at step 638 the database subsystem determines that the end of the RID list has been reached, then the operation ends.

Thus, the illustrative embodiments provide mechanisms for improving the performance of skip-sequential processing of records using Adaptive List Prefetch. Using an Adaptive List Prefetch mechanism may minimize the elapsed time of performing read operations, minimize control unit processing overhead, minimize control unit cache usage, minimize buffer pool usage, minimize channel usage, and/or minimize host CPU overhead.

It should be appreciated that the illustrative embodiments may take the form of a specialized hardware embodiment, a software embodiment that is executed on a computer system having general processing hardware, or an embodiment containing both specialized hardware and software elements that are executed on a computer system having general processing hardware. In one exemplary embodiment, the mechanisms of the illustrative embodiments are implemented in a software product, which may include but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, or semiconductor system, apparatus, or device. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read-only memory (CD-ROM), compact disk—read/write (CD-R/W) and DVD.

The program code of the computer program product may comprise instructions that are stored in a computer readable storage medium in a client or server data processing system. In a client data processing system embodiment, the instructions may have been downloaded over a network from one or more remote data processing systems, such as a server data processing system, a client data processing system, or a plurality of client data processing systems using a peer-to-peer communication methodology. In a server data processing system embodiment, the instructions may be configured for download, or actually downloaded, over a network to a remote data processing system, e.g., a client data processing system, for use in a computer readable storage medium with the remote data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for retrieving records into a main memory, the method comprising:
receiving a first number of gaps and a first total gap size for a list of records from a database subsystem, wherein each gap represents a space between two non-contiguous records in the list of records as stored, based on a respective address of each of the two non-contiguous records;
determining a first average gap size using the first number of gaps and the first total gap size; and
upon determining the first average gap size is less than or equal to a prestaging threshold value, retrieving the list of records using prestaging.

2. The method of claim 1, further comprising:
upon determining the first average gap size is greater than the prestaging threshold value, retrieving the list of records without using prestaging.

3. The method of claim 1, further comprising:
for each gap between two records in the list of records, calculating a gap size between a first record and a second record; and
responsive to the gap size being zero, constructing an address word that identifies the location of a first buffer in the main memory where the second record is to be stored.

4. The method of claim 1, further comprising:
for each gap between two records in the list of records, calculating a gap size between a first record and a second record;
responsive to the gap size being greater than zero, determining if the gap size is greater than a maximum gap filling threshold value;
responsive to the gap size being equal to or less than the maximum gap filling threshold value, constructing a first address word for the gap that identifies the length of the gap and includes a skip flag for the gap between the two records; and
constructing a second address word that identifies the location of a buffer in the main memory where the second record is to be stored.

5. The method of claim 4, further comprising:
responsive to the gap size being greater than the maximum gap filling threshold value, incrementing the number of gaps by a value of one and incrementing the total gap size by the size of the gap;
inserting an embedded locate record; and
constructing the second address word that identifies the location of a buffer in the main memory where the second record is to be stored.

6. The method of claim 1, wherein the records in the list of records are retrieved into one or more buffers in the main memory that are identified by one or more address words.

7. The method of claim 1, wherein the receiving, the determining, the setting, and the retrieving are performed by at least one of an I/O driver or a storage controller.

8. The method of claim 1, further comprising:
receiving a record identifier list;
adding a first record in the record identifier list to the set of records in the list of records;
determining if the set of records in the list of records equals a maximum prefetch quantity; and
responsive to the set of records meeting the maximum prefetch quantity, sending the list of records to at least one of an I/O driver or a storage controller.

9. The method of claim 8, further comprising:
responsive to the set of records failing to meet the maximum prefetch quantity, fetching a next record from the record identifier list;
calculating a current gap size between the first record and the next record;
determining if the current gap size is less than a minimum gap size value; and responsive to the current gap size being less than the minimum gap size value, adding the next record to the set of records in the list of records.

10. The method of claim 9, further comprising:
responsive to the current gap size failing to be less than the minimum gap size value, determining if a second number of gaps is greater than a minimum number of gaps;
responsive to the second number of gaps being greater than a minimum number of gaps, determining if the current gaps size exceeds a moving average gap size by a threshold delta; and
responsive to the current gaps size exceeding the moving average gap size by the threshold delta, truncating the list of records.

11. A computer program product comprising a computer useable medium having a computer readable program, wherein the computer readable program, when executed on a computing device, causes the computing device to:
receive a first number of gaps and a first total gap size for a list of records from a database subsystem, wherein each gap represents a space between two non-contiguous records in the list of records as stored, based on a respective address of each of the two non-contiguous records;
determine a first average gap size using the first number of gaps and the first total gap size; and
upon determining the first average gap size is less than or equal to a prestaging threshold value, retrieve the list of records using prestaging.

12. The computer program product of claim 11, wherein the computer readable program further causes the data processing system to:
upon determining the first average gap size is greater than the prestaging threshold value, retrieve the list of records without using prestaging.

13. The computer program product of claim 11, wherein the computer readable program further causes the data processing system to:
for each gap between two records in the list of records, calculate a gap size between a first record and a second record; and
responsive to the gap size being zero, construct an address word that identifies the location of a first buffer in the main memory where the second record is to be stored.

14. The computer program product of claim 11, wherein the computer readable program further causes the data processing system to:
for each gap between two records in the list of records, calculate a gap size between a first record and a second record;
responsive to the gap size being greater than zero, determine if the gap size is greater than a maximum gap filling threshold value;
responsive to the gap size being equal to or less than the maximum gap filling threshold value, construct a first address word for the gap that identifies the length of the gap and includes a skip flag for the gap between the two records; and
construct a second address word that identifies the location of a buffer in the main memory where the second record is to be stored.

15. The computer program product of claim 14, wherein the computer readable program further causes the data processing system to:
responsive to the gap size being greater than the maximum gap filling threshold value, increment the number of gaps by a value of one and increment the total gap size by the size of the gap;
insert an embedded locate record; and
construct the second address word that identifies the location of a buffer in the main memory where the second record is to be stored.

16. A system, comprising:
a processor; and
a main memory coupled to the processor, wherein the memory comprises instructions which, when executed by the processor, cause the processor to:
receive a first number of gaps and a first total gap size for a list of records from a database subsystem, wherein each gap represents a space between two non-contiguous records in the list of records as stored, based on a respective address of each of the two non-contiguous records;
determine a first average gap size using the first number of gaps and the first total gap size; and
upon determining the first average gap size is less than or equal to a prestaging threshold value, retrieving the list of records using prestaging.

17. The system of claim 16, wherein the instructions further cause the processor to:
upon determining the first average gap size is greater than the prestaging threshold value, retrieve the list of records without using prestaging.

18. The system of claim 16, wherein the instructions further cause the processor to:
for each gap between two records in the list of records, calculate a gap size between a first record and a second record; and
responsive to the gap size being zero, construct an address word that identifies the location of a first buffer in the main memory where the second record is to be stored.

19. The system of claim 16, wherein the instructions further cause the processor to:
for each gap between two records in the list of records, calculate a gap size between a first record and a second record;
responsive to the gap size being greater than zero, determine if the gap size is greater than a maximum gap filling threshold value;
responsive to the gap size being equal to or less than the maximum gap filling threshold value, construct a first address word for the gap that identifies the length of the gap and includes a skip flag for the gap between the two records; and
construct a second address word that identifies the location of a buffer in the main memory where the second record is to be stored.

20. The system of claim 19, wherein the instructions further cause the processor to:
responsive to the gap size being greater than the maximum gap filling threshold value, increment the number of gaps by a value of one and increment the total gap size by the size of the gap;
insert an embedded locate record; and
construct the second address word that identifies the location of a buffer in the main memory where the second record is to be stored.

* * * * *